(12) United States Patent
Chen et al.

(10) Patent No.: US 7,641,374 B2
(45) Date of Patent: Jan. 5, 2010

(54) BACKLIGHT MODULE AND LIGHT GUIDE PLATE THEREOF

(75) Inventors: Ping-Yeng Chen, Feng Yuan (TW); Kuo-Jui Huang, Ta Li (TW); Pei-Yin Chang, Yun Lin Town (TW)

(73) Assignee: Wintek Corporation, Taichung (TW)

( * ) Notice: Subject to any disclaimer, the term of this patent is extended or adjusted under 35 U.S.C. 154(b) by 237 days.

(21) Appl. No.: 11/802,501

(22) Filed: May 23, 2007

(65) Prior Publication Data

US 2007/0274097 A1    Nov. 29, 2007

(30) Foreign Application Priority Data

May 24, 2006   (TW) ................. 95118372 A

(51) Int. Cl.
*G02B 6/00* (2006.01)
*F21V 7/04* (2006.01)

(52) U.S. Cl. .............. 362/609; 362/607; 362/608; 362/606; 362/623; 362/625

(58) Field of Classification Search ......... 362/606–610, 362/624–626

See application file for complete search history.

(56) References Cited

U.S. PATENT DOCUMENTS

| 6,379,016 | B1 | 4/2002 | Boyd et al. | |
|---|---|---|---|---|
| 6,685,329 | B2 * | 2/2004 | Kim et al. | 362/626 |
| 6,700,632 | B2 | 3/2004 | Taniguchi et al. | |
| 6,704,070 | B2 | 3/2004 | Taniguchi et al. | |
| 6,717,635 | B2 | 4/2004 | Taniguchi et al. | |
| 6,734,929 | B2 | 5/2004 | Sugiura et al. | |
| 7,121,709 | B2 | 10/2006 | Shinohara et al. | |

FOREIGN PATENT DOCUMENTS

| CN | 1434336 A | 11/2005 |
|---|---|---|
| CN | 1437059 A | 10/2006 |

* cited by examiner

*Primary Examiner*—Stephen F Husar
*Assistant Examiner*—James W Cranson
(74) *Attorney, Agent, or Firm*—Muncy, Geissler, Olds & Lowe, PLLC

(57) ABSTRACT

A backlight module includes a light source and a light guide plate. The light guide plate includes a light-receiving surface next to a light source, a light-emitting surface, and a light-reflecting surface oppose to the light-emitting surface. A plurality of notches are formed on the light-reflecting surface, and each notch has a first inner surface facing the light source and a second inner surface back to the light source and opposite to the first inner surface. The inclination angle of the first inner surface with respect to the light-reflecting surface is no more than 35 degrees.

16 Claims, 9 Drawing Sheets

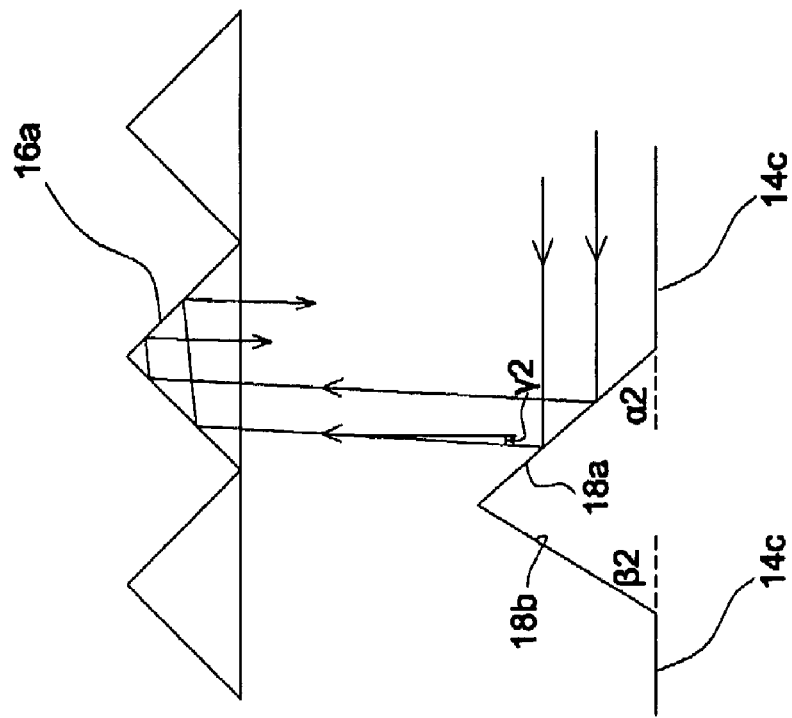
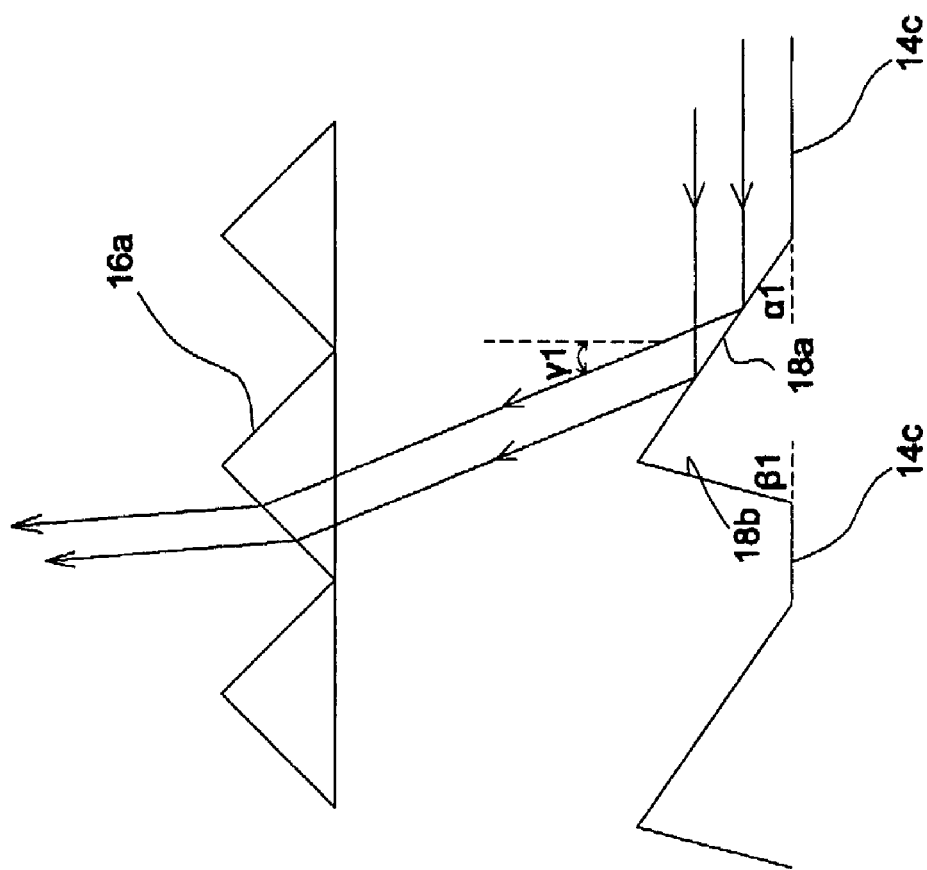
FIG. 4B
FIG. 4A

BACKLIGHT MODULE AND LIGHT GUIDE PLATE THEREOF

BACKGROUND OF THE INVENTION (a) Field of the Invention

The invention relates to a backlight module having improved light utilization efficiency and a light guide plate used in the backlight module.

(b) Description of the Related Art

Nowadays, various well-known methods have been used to form a light guide plate with microstructures (light scattering pattern). For example, an isotropic etching process is performed on a steel plate to produce a stamper having a micro-dot pattern. However, defects on an etched steel substrate often occur to lower the repeatability of the light scattering pattern on different light guide plates. Further, an isotropic etching process proceeding with equal velocities in all directions is hardly to avoid the formation of enlarged etch holes and fails to control the inclination surface angle of each microstructure to result in an unsatisfied luminous efficiency of a light guide plate.

Hence, another design where a machining tool is used to produce V-shaped notches is proposed to effectively control the inclination surface angle of each microstructure. Though such method may achieve a better luminous efficiency, its fabrication process is complicated because of the great demand for an accurate control on the dimension, positioning, and machining amount of a work piece. Besides, since the electronic product is made to be thinner and thinner on current trends, the V-shaped notches formed on a thin light guide plate are inevitably to have a shallow depth to result in the complexity of their fabrication processes.

Thus, another design where an anisotropic etching process is performed on a crystalline material is proposed to avoid the above problem. Since the anisotropic etching proceeds with different velocities in different directions in a single crystal to create a specific shape, it may achieve a high repeatability of the light scattering pattern on different light guide plates.

However, in all the above conventional designs, the inclination surface angles of the microstructures are not optimized to thus fail to further improve the luminous efficiency as well as the light utilization efficiency.

BRIEF SUMMARY OF THE INVENTION

An object of the invention is to provide a backlight module having improved light utilization efficiency and a light guide plate having high luminous efficiency.

According to the invention, a backlight module includes a light source and a light guide plate. The light guide plate includes a light-receiving surface next to a light source, a light-emitting surface, and a light-reflecting surface oppose to the light-emitting surface for guiding the emitting light of the light source to a display panel through the light-emitting surface. A plurality of notches are formed on the light-reflecting surface, and each notch has a first inner surface facing the light source and a second inner surface back to the light source and opposite to the first inner surface. The inclination angle of the first inner surface with respect to the light-reflecting surface is no more than 35 degrees.

Further, a brightness enhancement film and a diffusion sheet may be provided between the light guide plate and the display panel, and the inclination angle of the second inner surface with respect to the light-reflecting surface is preferably in the range of 75 to 90 degrees.

Through the design of the invention, since the inclination angle of the first inner surface facing the light source is set as no more than 35 degrees, the light beams reflected by the first inner surface are directed out of the light guide plate at an angle of more than 20 degrees with respect to the normal of the light-reflecting surface, so that most of the light beams arriving at the brightness enhancement film are not totally reflected by the micro-prisms and are properly directed to the human eye. This effectively increases the luminous efficiency of the light guide plate and improves the light utilization efficiency of a backlight module incorporating the light guide plate.

BRIEF DESCRIPTION OF THE DRAWINGS

FIGS. 4A and 4B show schematic diagrams illustrating the relationship between the inclination angle of a notch and the exit angle of light made to exit from the light guide plate.

DETAILED DESCRIPTION OF THE INVENTION

Figure 1:
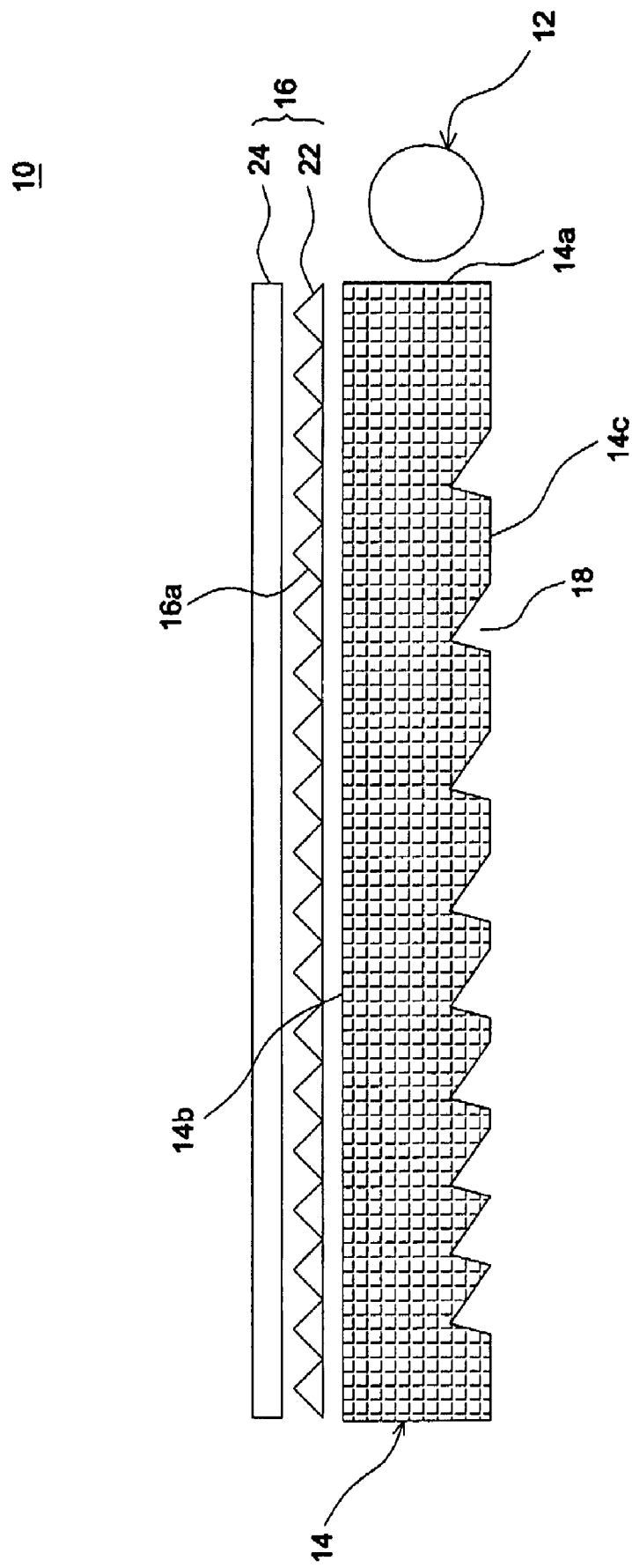
FIG. 1 shows a backlight module according to an embodiment of the invention.

FIG. 1 shows a backlight module 10 according to an embodiment of the invention. Referring to FIG. 1, the backlight module 10 includes a light source 12, a light guide plate 14, and a brightness enhancement film (BEF) 16. The light guide plate 14 has a light-receiving surface 14a positioned next to the light source 12, a light-emitting surface 14b perpendicular to the light-receiving surface 14a, and a light-reflecting surface 14c opposite to the light-emitting surface 14b. A plurality of notches 18 are formed on the light-reflecting surface 14c and concave to the light-emitting surface 14b. The emitting light of the light source 12 are deflected by the notches 18 and then guided to a display panel (not shown) through the light-emitting surface 14b. In this embodiment, the brightness enhancement film 16 includes a dual prism structure comprised of a first prism sheet 22 and a second prism sheet 24. After light transmitted via the light-emitting surface 14b arrives at the brightness enhancement film 16, micro-prisms 16a formed on the prism sheet may confine the light to propagate at an angle within a specific range through refraction and reflection. For example, a T-BEF type brightness enhancement film manufactured by 3M company may refract light within the viewing cone toward the viewer up to a half angle of 25 degrees off the perpendicular. Certainly, the light exit angle is varied according to the arrangement and the material of the prism sheets.

Figure 2:
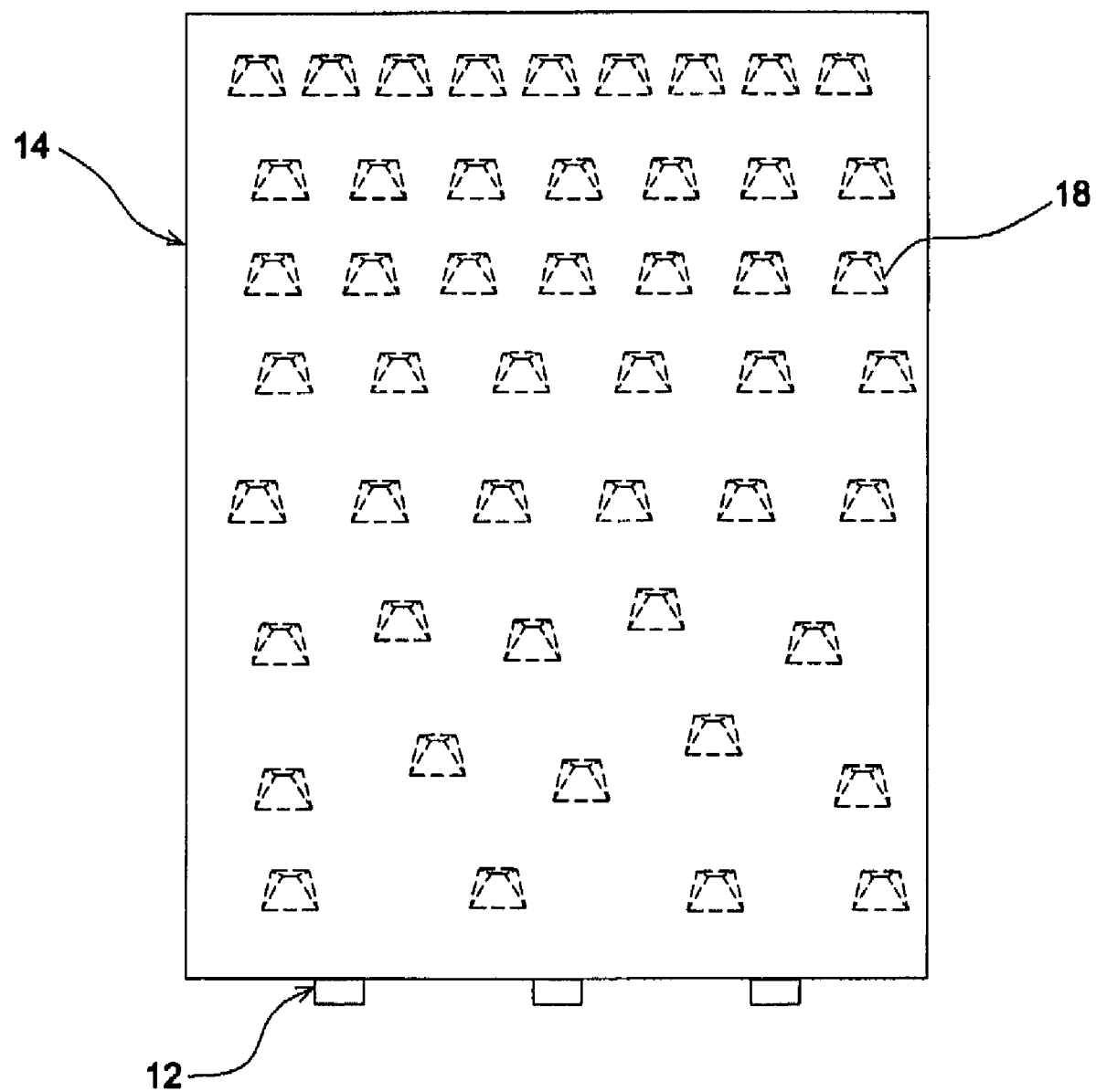
FIG. 2 shows a schematic diagram illustrating the distribution of notches on a light guide plate.

FIG. 2 shows a schematic diagram illustrating the distribution of notches 18 on a light guide plate 14. Note that the light guide plate 14 shown in FIG. 2 is viewed from above its light-emitting surface 14b, so the notches 18 formed on the light-reflecting surface 14c are indicated by dash lines. As shown in FIG. 2, the distribution density of the notches 18 on the light-reflecting surface 14c increases along with the increase of the distance away from the light source 12 so as to obtain high luminance uniformity of the light guide plate 14. Further, the light source 12 may be at least one cold-cathode fluorescent lamp (CCFL) or light-emitting diode (LED).

Figure 3A:
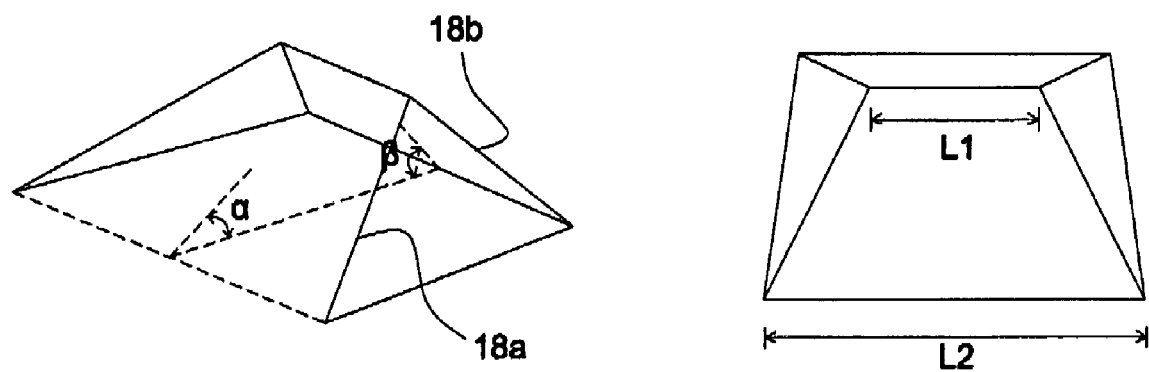
FIG. 3A and FIG. 3B show schematic diagrams illustrating different embodiments of the shape of a notch.
Figure 3B:
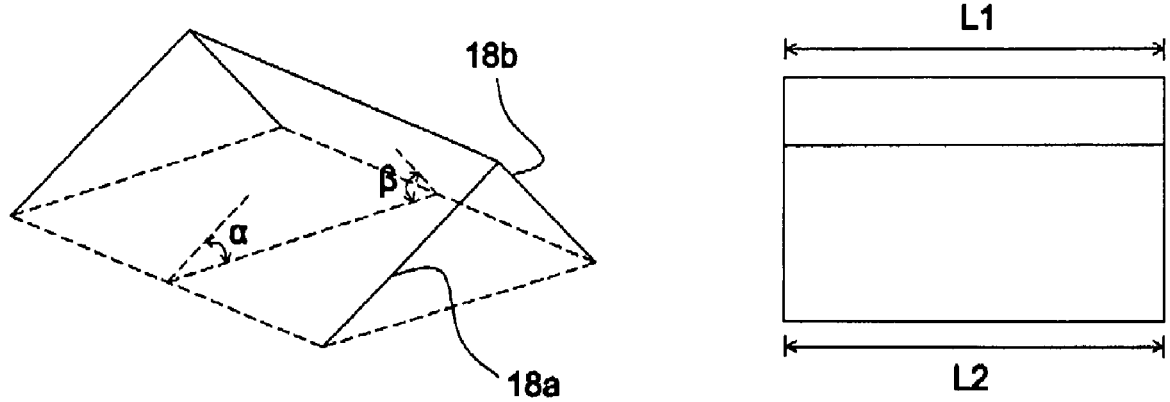

FIG. 3A and FIG. 3B show schematic diagrams illustrating different embodiments of the shape of a notch 18. Referring to FIG. 3A, the notch 18 has a shape of a pentahedron with three adjacent quadrilateral inner surfaces and two non-adjacent triangular inner surfaces, where a first quadrilateral inner surface 18a facing the light source 12 (comparably close to the light source 12) and a second quadrilateral inner surface 18b opposite to the first inner surface 18a and back to the light source 12 (comparably far from the light source 12) are angled relative to each other and share a common edge to form a V-shaped cross-section. Also, in this embodiment, the first inner surface 18a has a bottom length L2 larger than its top length L1. In an alternate embodiment shown in FIG. 3B, the first inner surface 18a has a bottom length L2 equal to its top length L1, and, therefore, the notch 18 has a shape of a triangular prism. Further, the inner surfaces 18a and 18b are mirror surfaces have a roughness less than 0.1 μm.

Besides, the inclination angle of an inner surface of a notch 18 is defined as an acute angle between the inner surface and the entire plane of the light-reflecting surface 14c, and, according to the invention, the inclination angle α of the first inner surface 18a facing the light source 12 is set as no more than 35 degrees.

FIGS. 4A and 4B show schematic diagrams illustrating the relationship between the inclination angle of a notch and the exit angle of light made to exit from the light guide plate 14.

In FIG. 4A, the inclination angle α1 between the first inner surface 18a and the light-reflecting surface 14c equals 35 degrees; in comparison, in FIG. 4B, the inclination angle α2 between the first inner surface 18a and the light-reflecting surface 14c equals 54 degrees. Referring to FIG. 4A, the incoming light beams are reflected by the first inner surface 18a (α1=35°) and then directed out of the light guide plate 14 at an exit angle γ1 of more than 20 degrees with respect to the normal of the entire plane of the light-reflecting surface 14c. Once the light beams made to exit from the light guide plate 14 propagate at an angle γ1 of more than 20 degrees with respect to the normal of the light-reflecting surface 14c, most of the light beams arriving at the brightness enhancement film 16 are not totally reflected by the micro-prisms 16a and are properly directed to the human eye. On the other hand, referring to FIG. 4B, the incoming light beams are reflected by the first inner surface 18a (α2=54°) and then directed out of the light guide plate at an exit angle γ2 of less than 10 degrees with respect to the normal of the light-reflecting surface 14c. Once the light beams made to exit from the light guide plate 14 propagate at an angle γ2 of less than 10 degrees with respect to the normal of the light-reflecting surface 14c, most of the light beams arriving at the brightness enhancement film 16 are totally reflected by the micro-prisms 16a and then reflected back and forth between the light guide plate 14 and the brightness enhancement film 16 to cause considerable energy loss.

Figure 5:
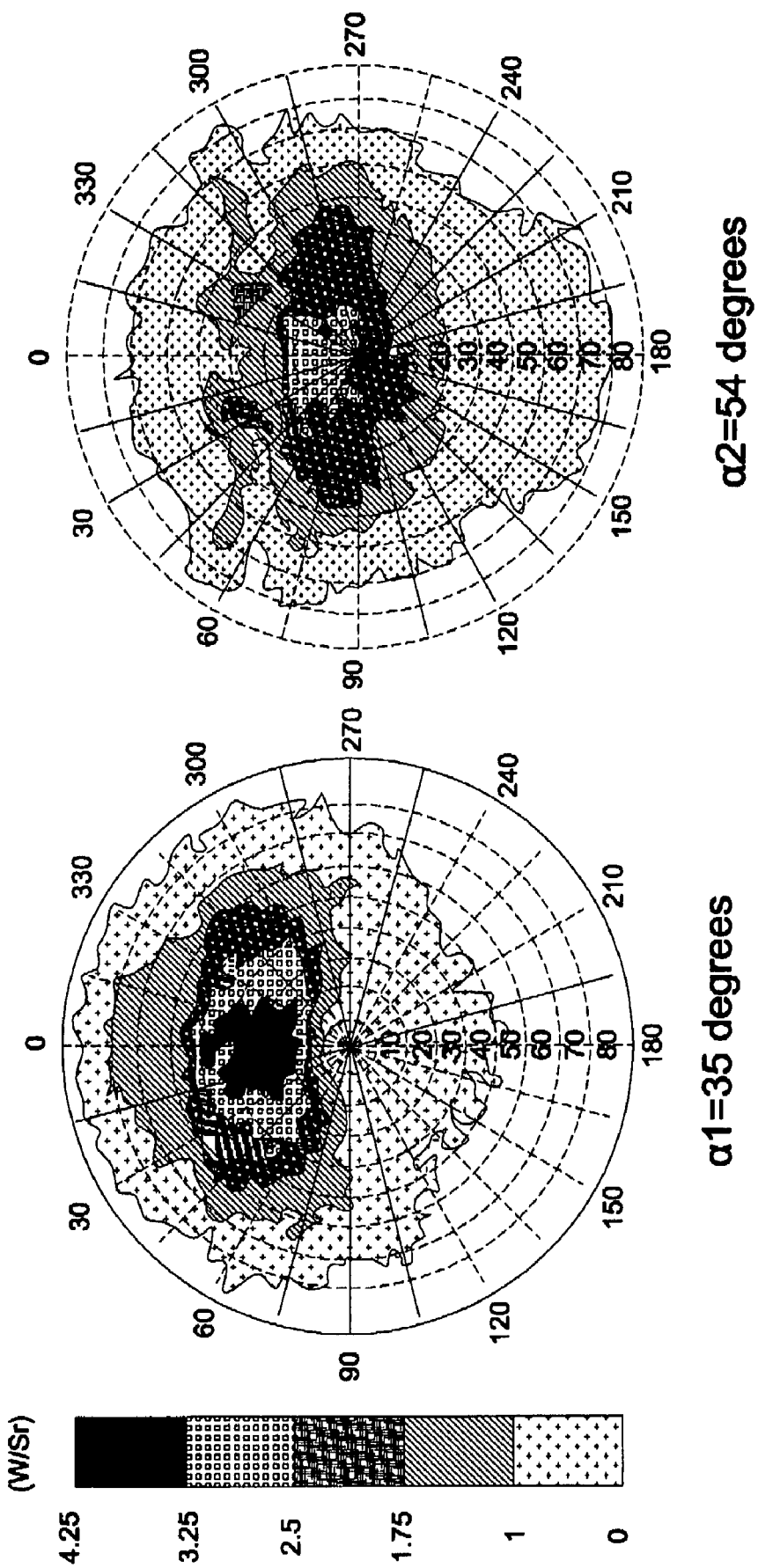
FIG. 5 shows simulation results of luminous distribution according to different inclination angles of a notch.

FIG. 5 shows simulation results of luminous distribution according to different inclination angles of a notch (α1=35° and α2=54°). Note that, in FIG. 5, one coordinate axis in the form of concentric circles measures the angle γ off the normal of the plane of a light guide plate. As shown in FIG. 5, when the inclination angle of the first inner surface 18a of a notch equals 35 degrees (α1=35°), most of the light beams exiting from the light guide plate 14 propagate at an angle γ1 in the range of 20 degrees to 30 degrees, so they are not totally reflected by the micro-prisms 16a and are properly directed to the human eye. In comparison, when the inclination angle of the first inner surface 18a equals 54 degrees (α2=54°), most of the light beams exiting from the light guide plate 14 propagate at an angle γ2 in the range of 0 degree to 10 degrees, so they are totally reflected by the micro-prisms 16a to cause energy loss.

Hence, according to the invention, since the inclination angle of the first inner surface 18a facing the light source 12 is set as no more than 35 degrees, the light beams reflected by the first inner surface 18a are directed out of the light guide plate 14 at an angle of more than 20 degrees with respect to the normal of the light-reflecting surface 14c, so that most of the light beams arriving at the brightness enhancement film 16 are not totally reflected by the micro-prisms 16a and are properly directed to the human eye. This effectively increases the luminous efficiency of the light guide plate and improves the light utilization efficiency of a backlight module incorporating the light guide plate. Moreover, according to the experiment results obtained by the inventors, the inclination angle between the first inner surfaces 18a and the light-reflecting surface 14c is preferably set in the range of 15 to 30 degrees to further increase the luminous efficiency.

Also, the inclination angle β of the second inner surface 18b back to the light source 12 (the angle between the second inner surface 18b of a notch 18 and the entire plane of the light-reflecting surface 14c) is preferably set in the range of 75 to 90 degrees to avoid an excess space of a notch and to maintain better light diffusion effect.

Figure 6:
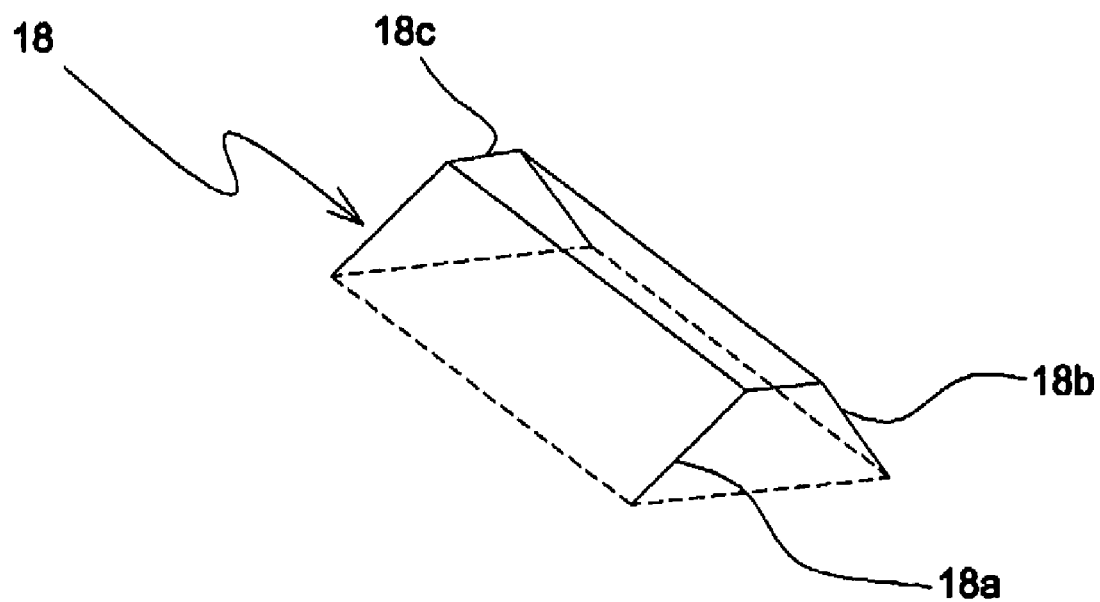
FIG. 6 shows schematic diagrams illustrating another shape modifications of a notch.
Figure 6:
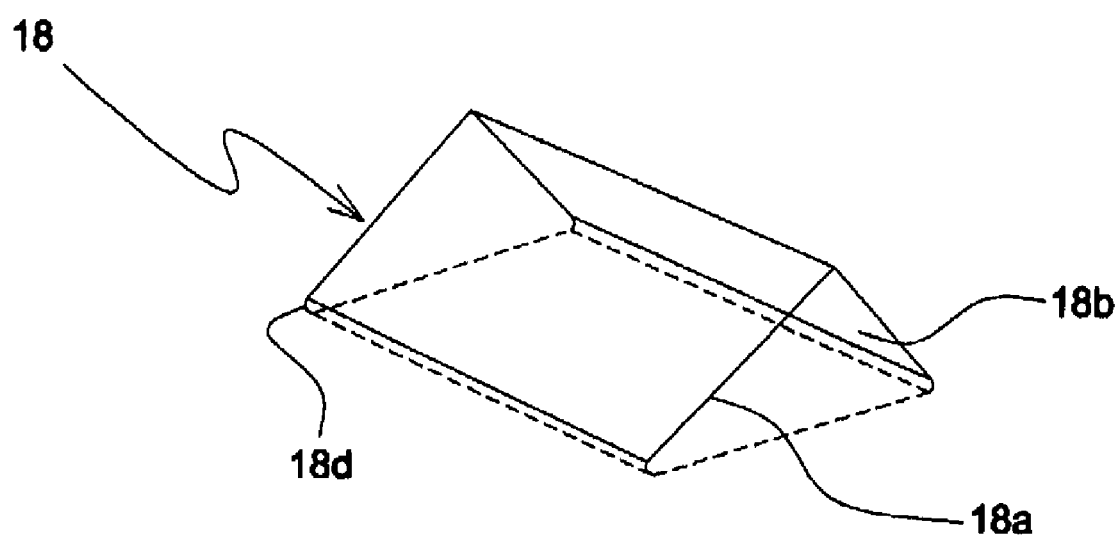

FIG. 6 shows schematic diagrams illustrating another shape modifications of a notch. As shown in FIG. 6, the notch 18 may have a shape of a truncated prism, with three inner surfaces 18a, 18b and 18c forming a U-shaped cross-section. Alternatively, the notch 18 may be rounded at its edges 18d.

Figure 7:
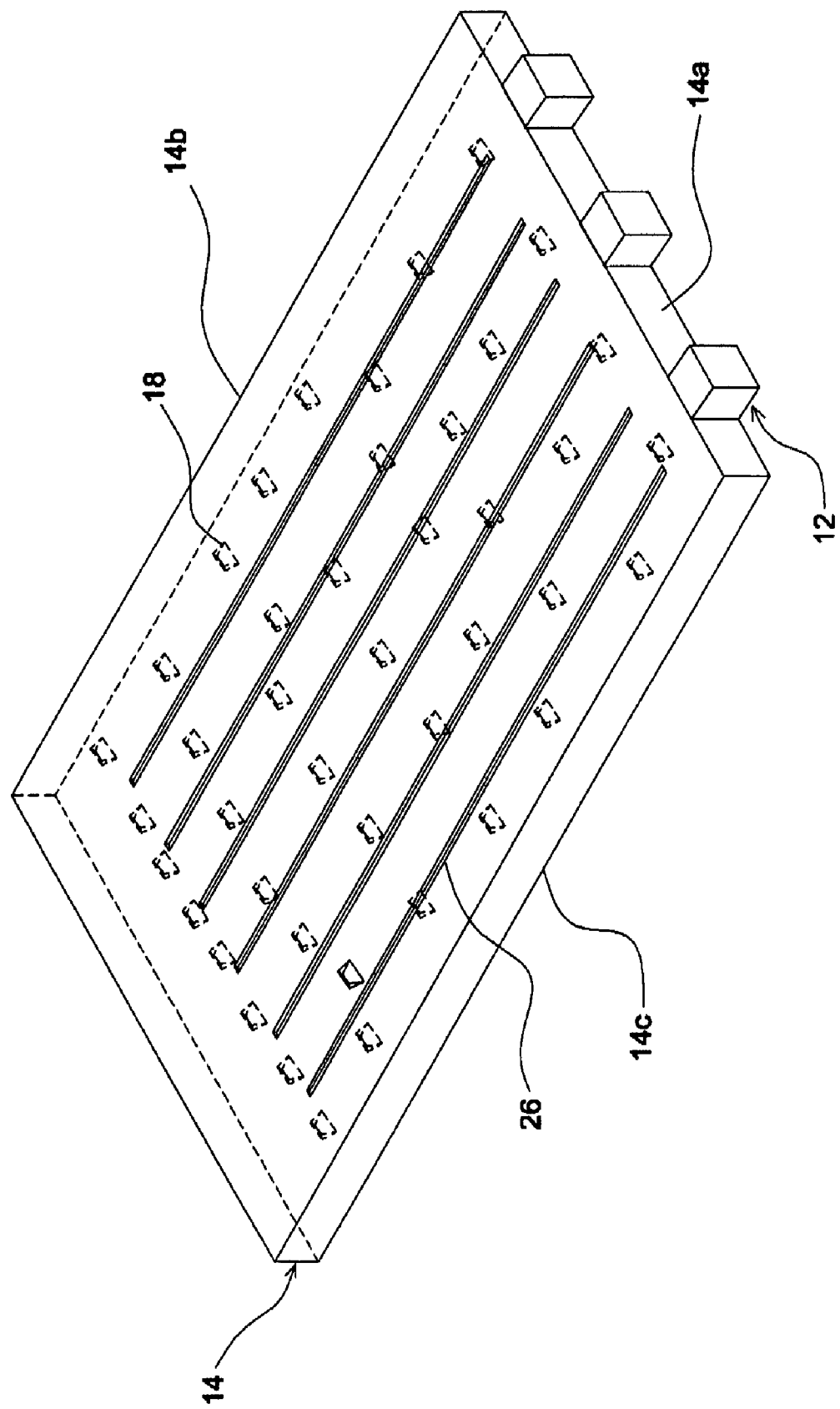
FIG. 7 shows a schematic diagram illustrating another embodiment of the invention.
Figure 8A:
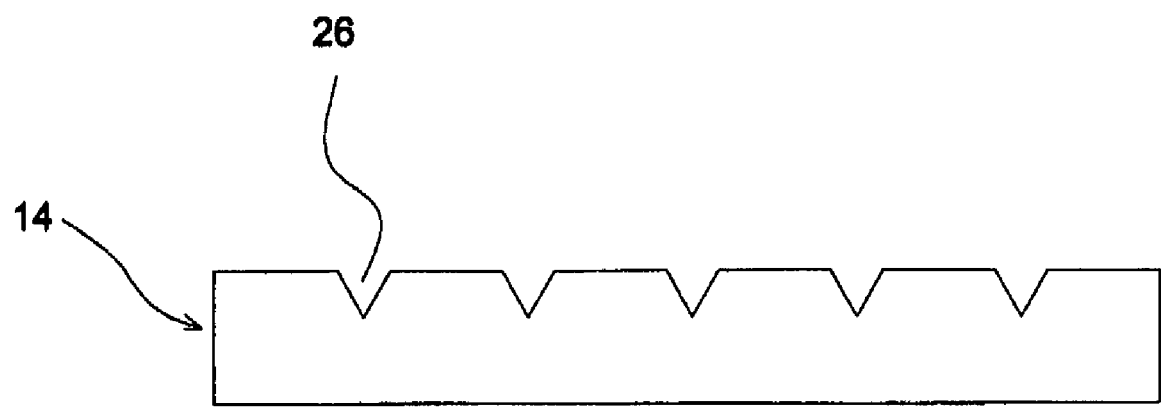
FIGS. 8A and 8B show schematic diagrams illustrating the arrangement of grooves on a light guide plate.
Figure 8B:
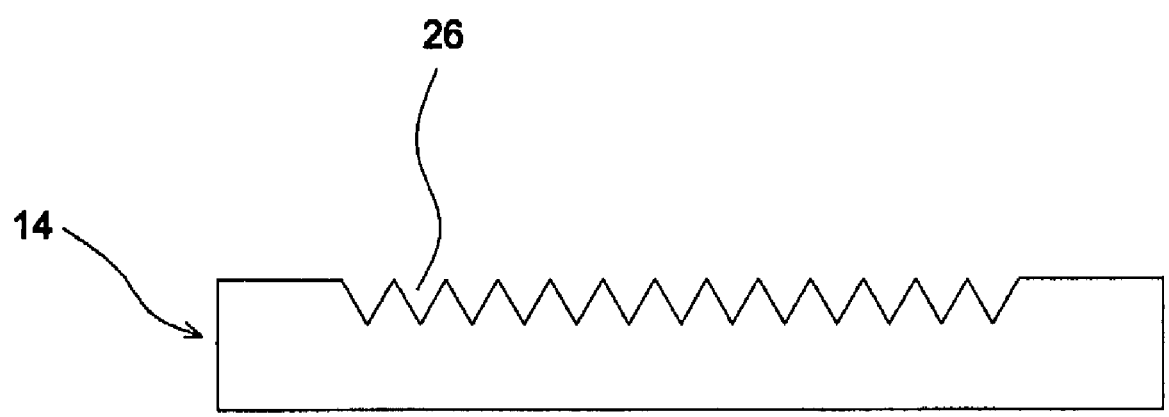

FIG. 7 shows a schematic diagram illustrating another embodiment of the invention. Referring to FIG. 7, a plurality of grooves 26 are formed on the light guide plate 14. In this embodiment, the grooves 26 are parallel with each other and their longitudinal directions are parallel to the normal of the light-receiving surface 14a. Besides, each groove 26 may have a V-shaped cross-section or a U-shaped cross section. Further, the arrangement of the grooves 26 on the light guide plate 14 is not limited to a specific manner. For example, the grooves 26 may be discretely provided as shown in FIG. 8A, where a space is formed between two adjacent grooves 26. Alternatively, the grooves 26 may be continuously provided as shown in FIG. 8B, where each two grooves 26 are next to each other. The grooves 26 may cooperate with the notch 18 to further improve the luminance uniformity and eliminate the formation of dark lines on the light guide plate 14. Note that the light guide plate 14 shown in FIG. 7 is viewed from above the light-emitting surface 14b, so the grooves 26 formed on the light-emitting surface 14b are indicated by solid lines, and the notches 18 formed on the light-reflecting surface 14c are indicated by dash lines.

Figure 9:
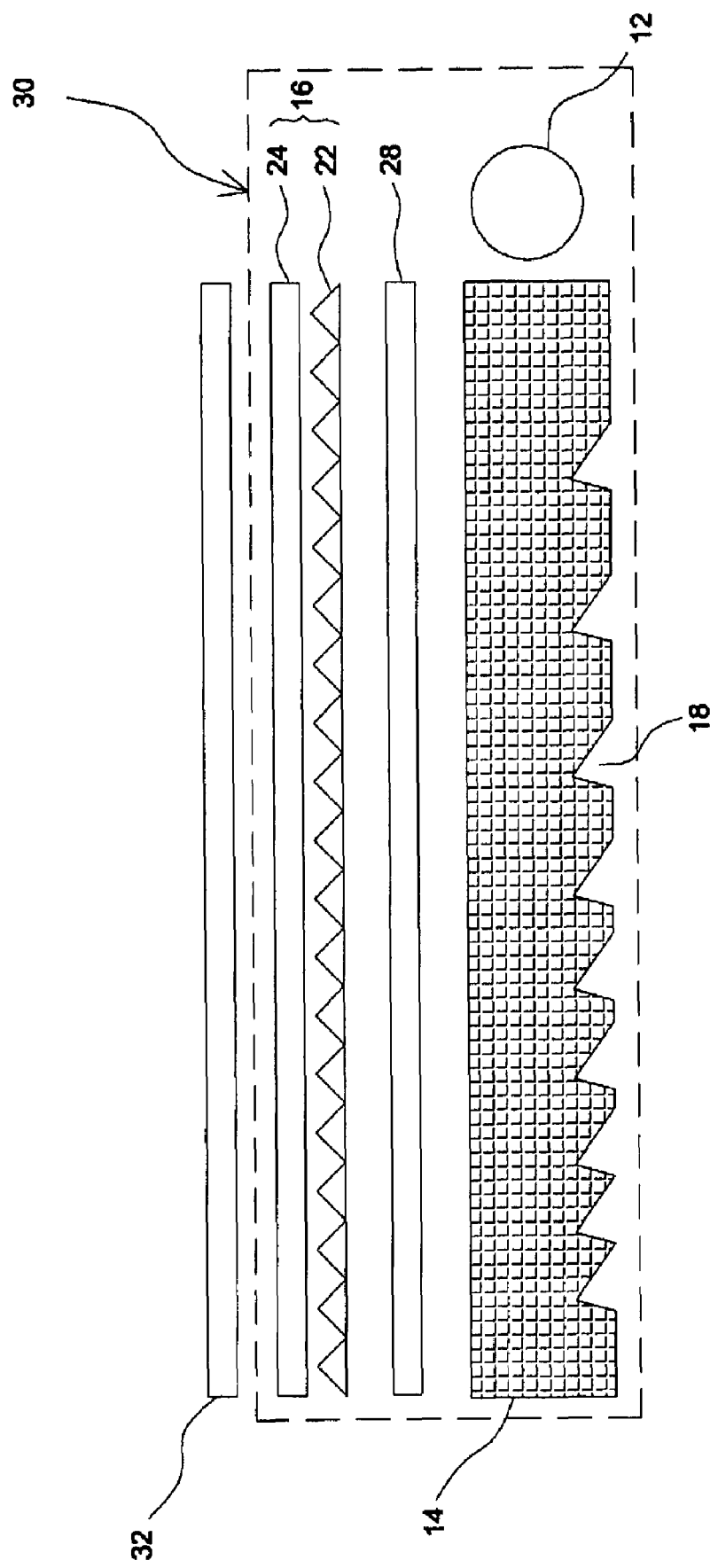
FIG. 9 shows a schematic diagram illustrating another embodiment of the invention.

FIG. 9 shows a schematic diagram illustrating another embodiment of the invention. Referring to FIG. 9, a backlight module 30 delivers emitting light of a light source 12 to a display panel 32, and the backlight module 30 further includes a diffusion sheet 28 positioned between a light guide plate 14 and the display panel 32 to obtain better luminance uniformity. Moreover, as for a certain product such as a monochromatic display that does not need intense panel brightness, the brightness enhancement film 16 can be omitted, but, in that case, the design of the invention where the inclination angle of the first inner surface 18a facing the light source 12 is set as no more than 35 degrees still helps to increase the amount of light entering the human eye.

While the invention has been described by way of examples and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A backlight module, comprising:
a light source; and
a light guide plate, comprising:
    a light-receiving surface next to the light source;
    a light-emitting surface;
    a light-reflecting surface oppose to the light-emitting surface for guiding the emitting light of the light source to a display panel through the light-emitting surface;
a plurality of notches formed on the light-reflecting surface, wherein each notch comprises a first inner surface facing the light source and a second inner surface back to the light source and opposite to the first inner surface, and the inclination angle of the first inner surface with respect to the light-reflecting surface is no more than 35 degrees; and
a plurality of grooves formed on the light-emitting surface, wherein the grooves are parallel with each other and their longitudinal directions are parallel to the normal of the light-receiving surface.

2. The backlight module as claimed in claim 1, further comprising a brightness enhancement film provided between the light guide plate and the display panel.

3. The backlight module as claimed in claim 1, further comprising a diffusion sheet provided between the light guide plate and the display panel.

4. The backlight module as claimed in claim 1, wherein the inclination angle of the second inner surface with respect to the light-reflecting surface is in the range of 75 to 90 degrees.

5. The backlight module as claimed in claim 1, wherein the inclination angle of the first inner surface with respect to the light-reflecting surface is in the range of 15 to 30 degrees.

6. The backlight module as claimed in claim 1, wherein the notch has a shape of a pentahedron.

7. The backlight module as claimed in claim 1, wherein the first and the second inner surfaces are angled relative to each other to form a V-shaped or a U-shaped cross-section.

8. The backlight module as claimed in claim 1, wherein each groove has a V-shaped or a U-shaped cross section.

9. The backlight module as claimed in claim 1, wherein the distribution density of the notches on the light-reflecting surface increases along with the increase of the distance away from the light source.

10. The backlight module as claimed in claim 1, wherein the light source is at least one cold-cathode fluorescent lamp (CCFL) or at least one light-emitting diode (LED).

11. A light guide plate used in a backlight module, comprising;
a light-receiving surface for receiving the emitting light of a light source;
a light-emitting surface;
a light-reflecting surface oppose to the light-emitting surface for guiding the emitting light of the light source to a display panel through the light-emitting surface; and
a plurality of notches formed on the light-reflecting surface, wherein each notch comprises a first inner surface facing the light source and a second inner surface back to the light source and opposite to the first inner surface, and the inclination angle of the first inner surface with respect to the light-reflecting surface is no more than 35 degrees; and
a plurality of grooves formed on the light-emitting surface, wherein the grooves are parallel with each other and their longitudinal directions are parallel to the normal of the light-receiving surface.

12. The light guide plate as claimed in claim 11, wherein the inclination angle of the second inner surface with respect to the light-reflecting surface is in the range of 75 to 90 degrees.

13. The light guide plate as claimed in claim 11, wherein the inclination angle of the first inner surface with respect to the light-reflecting surface is in the range of 15 to 30 degrees.

14. The light guide plate as claimed in claim 11, wherein the notch has a shape of a pentahedron.

15. The light guide plate as claimed in claim 11, wherein the first and the second inner surfaces are angled relative to each other to form a V-shaped or a U-shaped cross-section.

16. The light guide plate as claimed in claim 11 wherein each groove has a V-shaped or a U-shaped cross-section.

* * * * *